Patented Sept. 26, 1939

2,174,000

UNITED STATES PATENT OFFICE 2,174,000

PLASTIC AND METHOD OF PRODUCING SAME

Robert C. Hills and Maxwell M. Barnett, Port Sulphur, La.

No Drawing. Application October 23, 1937, Serial No. 170,624

2 Claims. (Cl. 260—79)

This invention relates to plastics and plasticizers, and to a method of producing same.

It has for its general object the provision of a new and improved method of producing a plastic resin.

Aldehyde-polysulphide resins for the most part are obtained in the form of soft elastic rubbery masses, and, therefore, have a restricted use in molding. A specific object of this invention is to provide a new and improved method of producing a granular plastic, particularly valuable as a molding powder with which fillers, colors, etc., can be readily mixed.

Other objects will become apparent from the following description, it being understood that the examples set forth therein are by way of illustration and not by way of limitation.

We have discovered that this plastic is produced by causing a reaction to take place between an aldehyde and a polysulphide of an alkali metal having a composition between $M_2S_2$ and $M_2S_{3.25}$ where M is the alkali metal. These limits have been found to be critical.

More specifically the reaction may be caused to take place between $Na_2S_3$ and formaldehyde, these ingredients being selected for this example because of their availability and relatively low cost. The invention is not limited to these however inasmuch as the polysulphides of potassium and other of the alkali metals may be employed so long as their compositions are within the limits mentioned, and instead of formaldehyde, other of the aldehydes, aldehyde derivatives or aldehyde polymers may be employed. Other substances which have been found suitable for use in place of the formaldehyde are for example paraformaldehyde and trioxymethylene. For the purposes of this application, therefore, the term "aldehyde" is to be regarded as including generally reactive bodies of aldehyde derivation or type and as including specifically true aldehydes, aldehyde derivatives and aldehyde polymers.

In carrying out the invention the metallic sulphide, or hydroxide, and sulphur are heated together in water to a temperature of say 90° C. and the aldehyde in solution is added thereto. The resin will precipitate in granular form in a rapid exothermic reaction which goes very near to completion. This precipitate may then be filtered, washed and dried, and is ready for use.

By way of a more specific example, a solution of sodium trisulphide is prepared by the dissolving 165 grams of sodium sulphide and 135 grams of sulphur in 500 cc. of water. The resulting solution is heated to 90° C. and to it is slowly added 500 cc. of 37 per cent formaldehyde solution. The resin is obtained as a granular precipitate which is filtered off, washed and dried, producing a white amorphous powder.

The proportions given represent a close approximation of the proportions which will give the maximum yield, but are not critical and will only affect the yield and the degree of completion of the reaction.

While the powdered resin obtained by this invention has some of the characteristics of the resins produced by the other aldehyde-polysulphide polymers, there are certain important differences. For example, this powdered resin has a light color, is practically odorless, has a higher melting point (M. P. approximately 140° C.), is insoluble in all common solvents including carbon bisulphide, and is highly resistant to chemical reaction. Thus, it has been found to be exceedingly resistant to the action of gasoline, alcohol, ether, acetone, etc., and to be equally resistant to the chemical action of strong sulphuric acid, all concentrations of hydrochloric acid, ammonia and alkalies.

Because of its powdered form, this resin may readily be mixed with fillers, pigments, etc., without first being treated and pulverized, and it may then be molded to any shape desired. It has been found to take the exact shape of the mold to the finest details, yet does not adhere to the molds and can, therefore, be readily removed when molded. It has a clear marble like appearance which is pleasing to the eye.

Being soluble in sulphur in substantially all proportions, the product herein described is especially useful as a plasticizing agent for sulphur as set out in our copending application. It also has an exceedingly high tensile strength which renders more durable articles made from it, and this strength is imparted to the sulphur where the material is employed as a plasticizing agent for sulphur.

Having described our invention, we claim:

1. The process of producing a granular plastic which consists in dissolving an alkali metal sulphide and sulphur in 500 c. c. of water, heating the resulting solution to 90° C., reacting therewith 500 c. c. of a 37% formaldehyde solution and thereafter filtering, washing and drying.

2. The granular plastic, produced according to to the process of claim 1, having a light color, being practically odorless, having a melting point of approximately 140° C. and being highly resistant to the chemical action of strong mineral acids and alkalies.

ROBERT C. HILLS.
MAXWELL M. BARNETT.